US012350844B2

(12) United States Patent
Teramoto

(10) Patent No.: US 12,350,844 B2
(45) Date of Patent: Jul. 8, 2025

(54) CONTROL SYSTEM

(71) Applicant: FANUC CORPORATION, Yamanashi (JP)

(72) Inventor: Kiichi Teramoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 230 days.

(21) Appl. No.: 17/791,173

(22) PCT Filed: Jan. 6, 2021

(86) PCT No.: PCT/JP2021/000226
§ 371 (c)(1),
(2) Date: Jul. 6, 2022

(87) PCT Pub. No.: WO2021/141049
PCT Pub. Date: Jul. 15, 2021

(65) Prior Publication Data
US 2023/0033679 A1 Feb. 2, 2023

(30) Foreign Application Priority Data

Jan. 10, 2020 (JP) ................. 2020-002976

(51) Int. Cl.
B25J 9/16 (2006.01)
B25J 13/08 (2006.01)
G05B 19/404 (2006.01)

(52) U.S. Cl.
CPC .......... B25J 9/1694 (2013.01); B25J 13/088 (2013.01); G05B 19/404 (2013.01);
(Continued)

(58) Field of Classification Search
CPC ........ B25J 9/163; B25J 9/1628; B25J 9/1638; B25J 9/1641; B25J 9/1651; B25J 9/1653;
(Continued)

(56) References Cited

U.S. PATENT DOCUMENTS

2012/0029699 A1   2/2012  Jing et al.
2015/0183114 A1*  7/2015  Takahashi .............. B25J 13/006
                                                                901/9
(Continued)

FOREIGN PATENT DOCUMENTS

CN   104742126 A   7/2015
CN   108356823 A   8/2018
(Continued)

OTHER PUBLICATIONS

Bancroft et al., "Data Fusion Algorithms for Multiple Inertial Measurement Units," Jun. 29, 2011, Sensors 2011, 11, pp. 6771-6798 (Year: 2011).*

(Continued)

Primary Examiner — Spencer D Patton
(74) Attorney, Agent, or Firm — Studebaker Brackett PLLC

(57) ABSTRACT

Provided is a control system that can control the operation of a robot with high accuracy. A control system 1 is provided with a sensor 44 that detects an acceleration that is based on the vibration of a robot 3, an interpolation unit 222 that interpolates a plurality of pieces of sensor data detected by the sensor 44, and a data generation unit 223 that generates combined data having a short sampling period on the basis of a plurality of pieces of interpolation data obtained through interpolation by the interpolation unit 222.

7 Claims, 4 Drawing Sheets

(52) U.S. Cl.
CPC .............. G05B 2219/37388 (2013.01); G05B 2219/37434 (2013.01); G05B 2219/37435 (2013.01); G05B 2219/37634 (2013.01); G05B 2219/39199 (2013.01)

(58) Field of Classification Search
CPC ...... B25J 9/1664; B25J 9/1669; B25J 9/1674; B25J 9/1692; B25J 9/1694; B25J 13/088; G05B 19/404; G05B 2219/37388; G05B 2219/37435; G05B 2219/37432; G05B 2219/37434; G05B 2219/37634; G05B 2219/39199
See application file for complete search history.

(56) References Cited

U.S. PATENT DOCUMENTS

| | | | | |
|---|---|---|---|---|
| 2020/0333764 | A1* | 10/2020 | Takahei | G05B 19/404 |
| 2023/0052996 | A1* | 2/2023 | Thomsen | B25J 9/1602 |

FOREIGN PATENT DOCUMENTS

| | | | | |
|---|---|---|---|---|
| CN | 109543703 | A | | 3/2019 |
| CN | 110125906 | A | | 8/2019 |
| CN | 110465936 | A | | 11/2019 |
| DE | 102007035485 | A1 * | 1/2009 | ........... B23K 26/046 |
| DE | 102013011065 | B4 | | 6/2015 |
| JP | H06-324733 | A | | 11/1994 |
| JP | H07-164358 | A | | 6/1995 |
| JP | 2011-167817 | A | | 9/2011 |
| JP | 2012-240142 | A | | 12/2012 |
| JP | 2014-018932 | A | | 2/2014 |
| JP | 2014-030857 | A | | 2/2014 |
| JP | 2015-123538 | A | | 7/2015 |
| JP | 2017-196704 | A | | 11/2017 |
| JP | 2019-042842 | A | | 3/2019 |
| WO | 2006/022201 | A1 | | 3/2006 |

OTHER PUBLICATIONS

International Search Report issued in PCT/JP2021/000226; mailed Mar. 30, 2021.

Han Jiang et al., "Joint Trajectory Planning Algorithm for Industrial Robots Based on Mixed Interpolation", China Mechanical Engineering, vol. 29, No. 12, pp. 1460?1466, Jun. 26, 2018.

Tang Baoping et al., "Hybrid Computed Order Tracking Method Based on Angular Acceleration", Chinese Journal of Mechanical Engineering, vol. 44, No. 8, pp. 144-147, Aug. 15, 2008.

Long Teng et al., "Trajectory planning of vibration suppression for hybrid structure flexible manipulator based on PSO non-uniform spline interpolation", Control and Decision, vol. 33, No. 6, pp. 978-988, Sep. 13, 2017.

Li Shaoyuan and Wang Jingcheng, "Intelligent Control", p. 202, Mechanical Industry Press, 1st edition, Jan. 2005.

Zhang Shuqin et al., "Space Rendezvous and Docking Measurement Technology and Engineering Applications", pp. 397-398, published by China Aerospace Press, 1st edition, Oct. 2005.

* cited by examiner

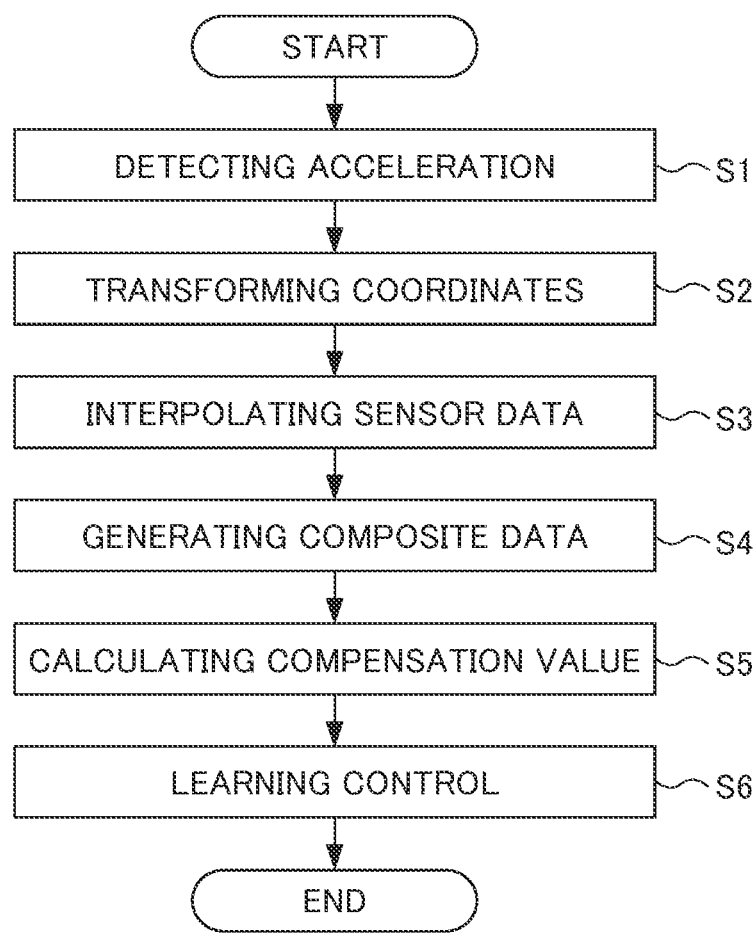

CONTROL SYSTEM

TECHNICAL FIELD

The present invention relates to a control system.

BACKGROUND ART

Robots such as industrial robots are known to perform laser machining, sealing, arc welding, etc. by controlling the position of an arm end (part under position control) of their robot mechanism. An increase in motion speed of a robot of this type shortens a takt time, whereby production efficiency can be improved. However, when the motion speed of the robot is increased, vibration may be produced at the arm end of the robot mechanism due to factors such as a reducer and the robot mechanism having insufficient rigidity, and such vibration may cause deterioration of the quality of a machining target.

Patent Documents 1 and 2 disclose robots that can solve these problems. These robots are equipped with a sensor at the arm end of the robot mechanism, and the sensor measures vibration produced at the arm end of the robot mechanism that is in motion in accordance with a motion program. The robots repeatedly perform learning control to calculate a learning compensation value to reduce the measured vibration. The robots use the learning compensation value to compensate the position control on the arm end (part under position control) of the robot mechanism to reduce the vibration of the arm end of the robot mechanism.

Patent Document 1: Japanese Unexamined Patent Application, Publication No. 2011-167817

Patent Document 2: Japanese Unexamined Patent Application, Publication No. 2012-240142

DISCLOSURE OF THE INVENTION

Problems to be Solved by the Invention

In order to perform the above-described learning control, it is necessary to install, at an arm end of a robot mechanism, a sensor for detecting vibration produced at the arm end. When a terminal device having such a sensor is attached to the arm end to detect vibration, there is a problem in that insufficient detection accuracy is achieved because the sensor provided in the terminal device typically has sparse sampling intervals. Under the foregoing circumstances, there has been a demand for a control system capable of controlling motion of a robot with high accuracy.

Means for Solving the Problems

An aspect of the present disclosure is directed to a control system including: a sensor that detects an acceleration based on vibration of a robot; an interpolator that interpolates a plurality of sets of sensor data detected by the sensor; and a data generator that generates composite data having fine sampling intervals, based on a plurality of sets of interpolation data interpolated by the interpolator.

Effects of the Invention

The present invention enables highly accurate control of motion of a robot.

BRIEF DESCRIPTION OF THE DRAWINGS

FIG. 4 is a flowchart illustrating processing performed by the robot control apparatus.

PREFERRED MODE FOR CARRYING OUT THE INVENTION

Figure 1:
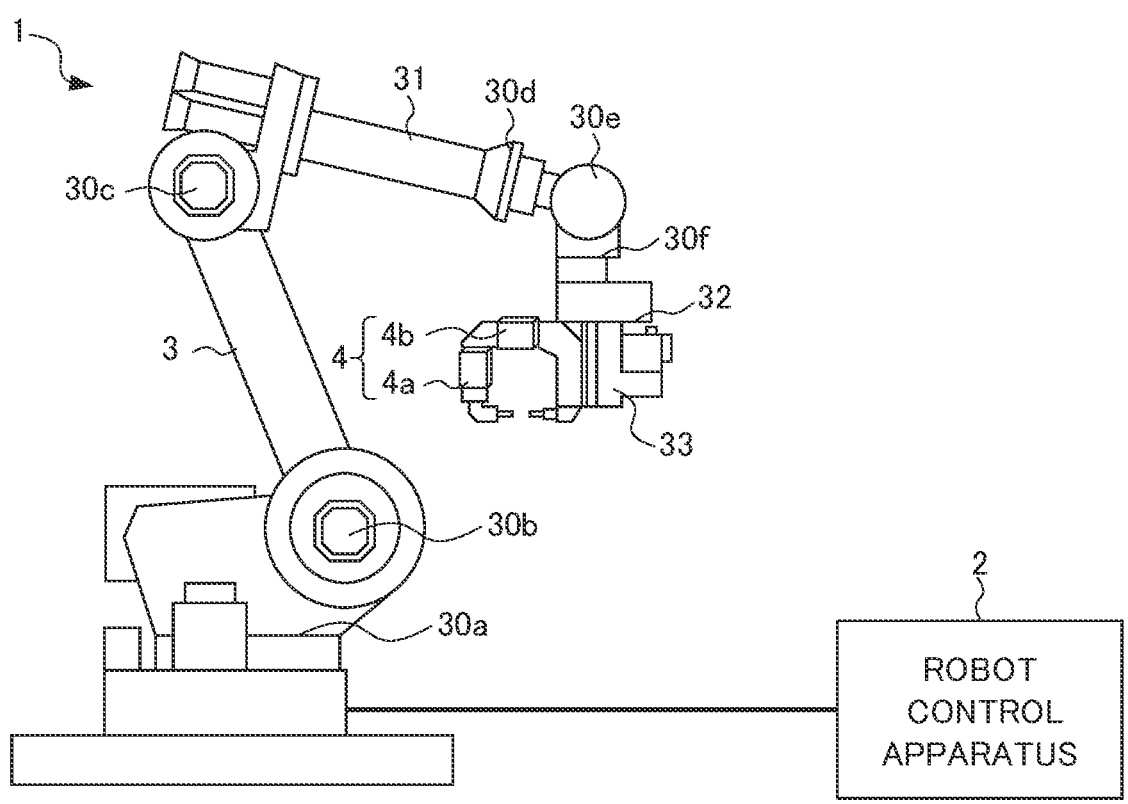
FIG. 1 is a diagram illustrating an overview of a control system according to an embodiment.

An example of embodiments of the present invention will be described below. FIG. 1 is a diagram illustrating an overview of a control system 1 according to the present embodiment. As illustrated in FIG. 1, the control system 1 includes a robot control apparatus 2, a robot 3, and terminal devices 4a and 4b.

The robot control apparatus 2 outputs a motion command to the robot 3 in accordance with a robot program and thereby controls motion of the robot 3. For example, the robot 3 is a six-axis vertically articulated robot and has an arm 31 connected via joint axes, as illustrated in FIG. 1.

In response to a motion command from the robot control apparatus 2, the robot 3 drives its movable parts, such as the arm 31, by driving servomotors 30a to 30f each of which is installed at an associated one of the joint axes. The servomotors 30a to 30f are collectively referred to also as the servomotors 30.

The robot 3 has a flange 32 to which an end effector 33, such as a welding gun, a gripping hand, or a laser irradiation device, is attached. Although the robot 3 is a six-axis vertically articulated robot, it may be configured as a vertically articulated robot with a different number of axes, a horizontally articulated robot, a parallel link robot, or the like.

The terminal devices 4a and 4b are attached to the end effector 33 of the robot 3. The terminal devices 4a and 4b detect an acceleration that is based on vibration of the robot 3 and transmit the detected sensor data to the robot control apparatus 2. The terminal devices 4a and 4b are collectively referred to also as the terminal devices 4.

Figure 2:
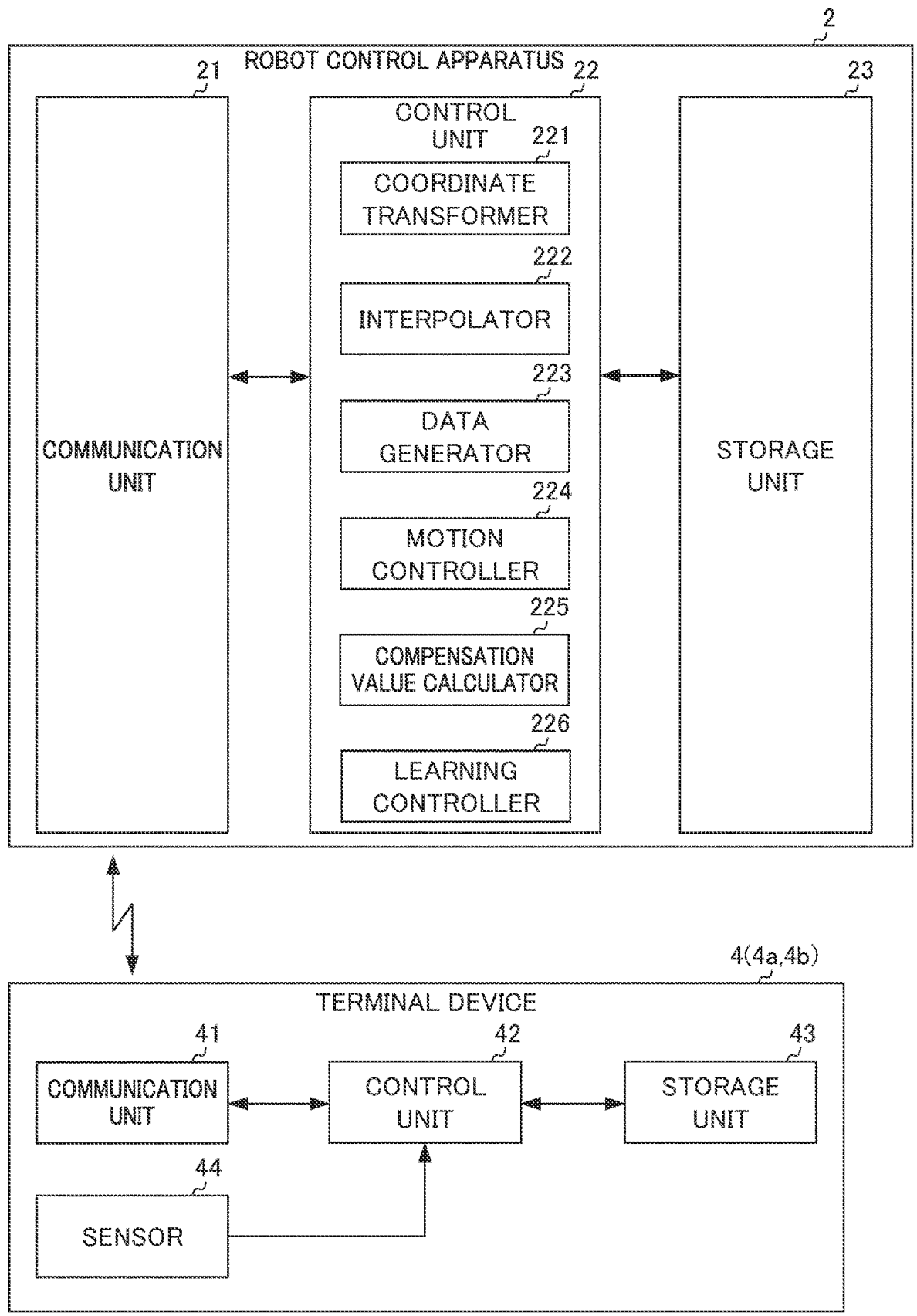
FIG. 2 is a block diagram illustrating a configuration of a robot control apparatus and a configuration of a terminal device.

FIG. 2 is a block diagram illustrating a configuration of the robot control apparatus 2 and that of the terminal devices 4. The robot control apparatus 2 includes a communication unit 21, a control unit 22, and a storage unit 23.

The communication unit 21 is a communication interface for communication with the terminal devices 4 via a network. The communication unit 21 includes, for example, a processor, a connector, and an electrical circuit with which the communication is implemented. The communication unit 21 acquires data by performing predetermined processing on a communication signal received from the terminal devices 4, and inputs the acquired data to the control unit 22. Furthermore, the communication unit 21 generates a communication signal by performing predetermined processing on data inputted from the control unit 22, and transmits the generated communication signal to the terminal devices 4. For example, the communication unit 21 receives sensor data from the terminal devices 4.

The control unit 22 is a processor such as a central processing unit (CPU) and functions as a coordinate transformer 221, an interpolator 222, a data generator 223, a motion controller 224, a compensation value calculator 225, and a learning controller 226, by executing programs stored in the storage unit 23.

The storage unit 23 is a storage device, such as read only memory (ROM) that stores an operating system (OS) and application programs, random access memory (RAM), a hard disk drive or a solid state drive (SSD) that stores various other pieces of information, etc. The storage unit 23 stores, for example, a robot program to operate the robot 3.

The terminal devices 4 (terminal devices 4a and 4b) include a communication unit 41, a control unit 42, a storage unit 43, and a sensor 44.

The communication unit 41 is a communication interface for communication with the robot control apparatus 2 via a network. The communication unit 41 includes, for example, a processor, a connector, and an electrical circuit with which the communication is implemented. The communication unit 41 acquires data by performing predetermined processing on a communication signal received from the robot control apparatus 2, and inputs the acquired data to the control unit 42. Furthermore, the communication unit 41 generates a communication signal by performing predetermined processing on data inputted from the control unit 42, and transmits the generated communication signal to the robot control apparatus 2.

The control unit 42 is a processor such as a central processing unit (CPU). The storage unit 43 is a storage device, such as read only memory (ROM) that stores an operating system (OS) and application programs, random access memory (RAM), a hard disk drive or a solid state drive (SSD) that stores various other pieces of information, etc.

The sensor 44 is an acceleration sensor that detects, cyclically at predetermined sampling intervals, an acceleration at which the end effector 33 moves due to motion of the robot 3. The sensor 44 is not limited to the acceleration sensor, but may be, for example, a vision sensor, a gyro sensor, an inertia sensor, or a strain gauge.

The control unit 42 has a clock (not shown). Each time the control unit 42 detects an acceleration, it acquires time information outputted from the clock, as the clock time at which the acceleration was detected. The communication unit 41 transmits a sensor signal including the detected acceleration and the time information and constituting the sensor data to the robot control apparatus 2.

Figure 3:
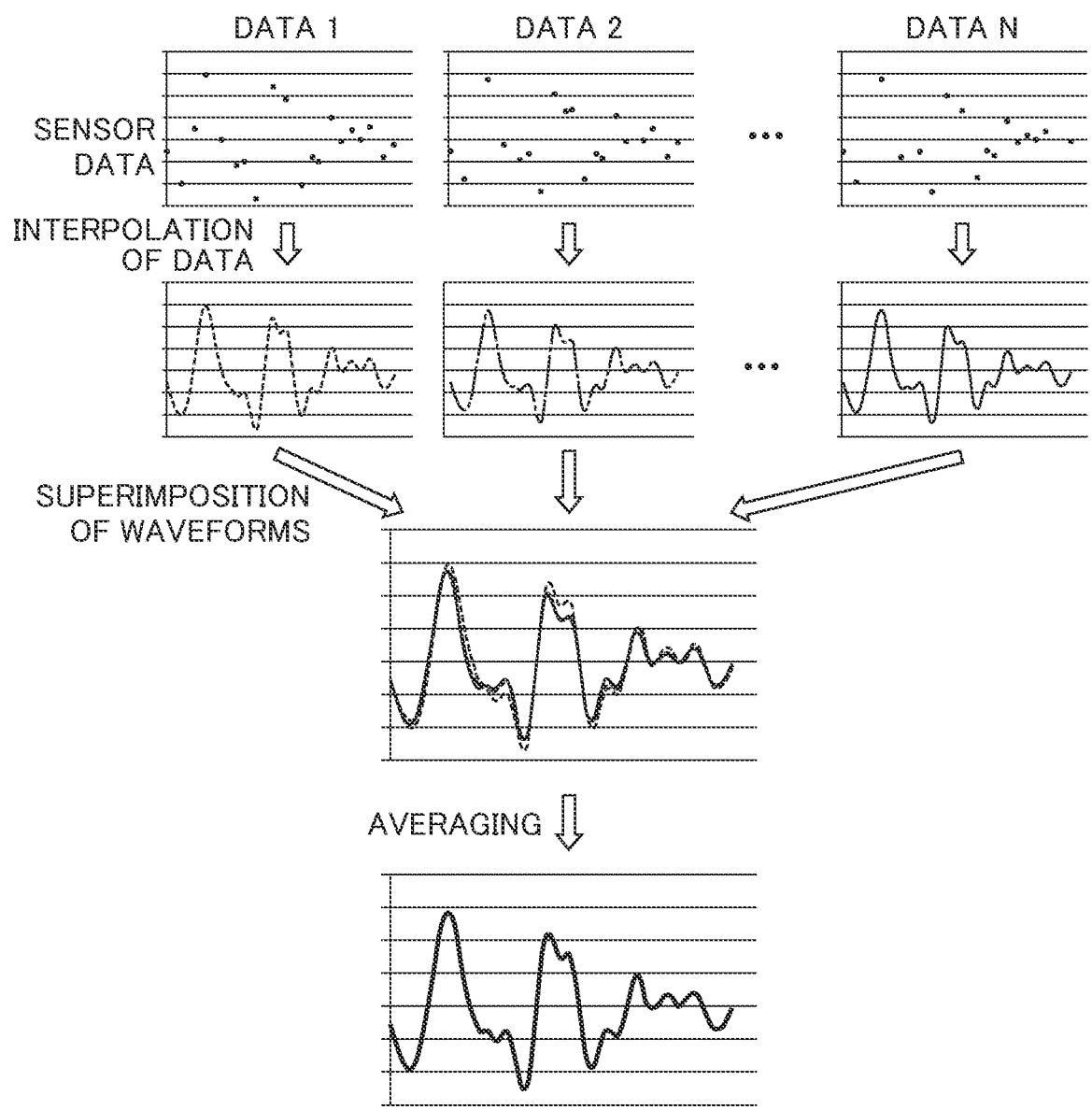
FIG. 3 illustrates processing for combining sensor data.

Next, control performed by the control unit 22 will be described with reference to FIGS. 2 and 3. FIG. 3 illustrates processing for combining sensor data. As illustrated in FIG. 3, the sensor 44 of the terminal device 4a and the sensor 44 of the terminal device 4b detect N sets of sensor data. The present embodiment is described based on an example in which the terminal devices 4 acquire the sensor data by means of the two terminal devices 4a and 4b. However, the terminal devices 4 may acquire sensor data by means of three or more terminal devices. Alternatively, one terminal device 4 may acquire sensor data multiple times.

The coordinate transformer 221 transforms the sets of sensor data received by the communication unit 21, from a sensor coordinate system based on a surface of the flange 32 of the robot 3 as the coordinate reference, to a tool coordinate system based on a distal end of the robot 3 as the coordinate reference. The sensor coordinate system is determined by pre-setting the position and orientation of the sensor 44 of each of the terminal devices 4a and 4b based on, for example, the surface of the flange 32 of the robot 3, which serves as the reference. The distal end of the robot 3 is, for example, the end effector 33.

Thus, even if the robot control apparatus 2 acquires the sensor data detected by the sensors 44 of the plurality of terminal devices 4a and 4b at different positions, the robot control apparatus 2 can control the position of the distal end of the robot 3 having the end effector 33 attached thereto, by means of a position defined in the tool coordinate system. The coordinate transformer 221 may also use a flange coordinate system in a case where the tool coordinate system is not defined.

The interpolator 222 interpolates the plurality of sets of sensor data subjected to the coordinate transformation. Specifically, as illustrated in FIG. 3, the interpolator 222 interpolates the plurality of sets of sensor data, which are discrete, and thereby generates continuous interpolation data. For example, the interpolator 222 generates the interpolation data using linear interpolation or spline interpolation.

The data generator 223 generates composite data having fine sampling intervals, based on the plurality of sets of interpolation data interpolated by the interpolator. Specifically, the data generator 223 combines the plurality of sets of interpolation data, and thereby generates one set of composite data. More specifically, the data generator 223 superimposes the waveforms of the plurality of sets of interpolation data on each other, thereby generating the one set of composite data. Furthermore, the data generator 223 averages the composite data resulting from combining the plurality of sets of interpolation data.

The data generator 223 may calculate a correlation coefficient on the basis of the plurality of sets of interpolation data, combine the plurality of sets of interpolation data on the basis of the correlation coefficient, and average the composite data resulting from combining the plurality of sets of interpolation data. By combining the plurality of sets of interpolation data in this manner, the data generator 223 can generate the composite data having fine sampling intervals.

Since each of the plurality of sets of interpolation data is not time-synchronized with each other, the data generator 223 time-synchronizes the plurality of sets of interpolation data with each other and generates composite data, based on the plurality of time-synchronized sets of interpolation data.

For example, the data generator 223 computes a correlation value C, which is a numerical form of the correlation between first interpolation data f(t) resulting from interpolation of a first set of sensor data and second interpolation data g(t) resulting from interpolation of a second set of sensor data. The data generator 223 then computes a delay time $t_a$ of the first interpolation data f(t) with respect to the second interpolation data g(t), according to the correlation value C.

The correlation value C can be determined by, for example, applying the least-squares method to a continuous function. Specifically, the difference between the first interpolation data f(t) and the second interpolation data g(t) at an identical point in time is squared, and this squared value is then integrated over a given time range. The sum of squares calculated in this manner is defined as the correlation value C. More specifically, the correlation value C can be given by the following formula.

$$c = \int \{(f(t) - g(t))\}^2 dt \qquad \text{[Formula 1]}$$

In this case, as the correlation between the first interpolation data f(t) and the second interpolation data g(t) becomes higher, the value calculated by the least-squares method, i.e., the correlation value C becomes smaller. An optimal delay time $t_a$ is given by the following formula.

$$\operatorname*{argmin}_{t_a} \int \{(f(t - t_a) - g(t))\}^2 dt \qquad \text{[Formula 2]}$$

For example, if the sensor data is spline-interpolated, f(t) and g(t) are each given by a polynomial with t.

$$\int \{(f(t-t_a)-g(t)\}^2 dt \quad \text{[Formula 3]}$$

Accordingly, this formula can be regarded as a polynomial of the delay time $t_a$. Therefore, the optimal delay time $t_a$ can be calculated by, for example, Newton's method.

The correlation value C, which represents a degree of correlation between the first interpolation data f(t) and the second interpolation data g(t), can also be calculated as follows, instead of using the least-squares method.

$$c = \int f(t)g(t)dt \quad \text{[Formula 4]}$$

As the correlation between the first interpolation data f(t) and the second interpolation data g(t) becomes higher, the correlation coefficient becomes larger. In this case, the delay time $t_a$ is determined by the same procedure as in the case of the least-squares method. That is, if f(t) and g(t) are given by a polynomial with t, an optimal delay time $t_a$ can be calculated using, for example, Newton's method.

For example, the data generator 223 computes a delay time $t_a$ of each of the plurality of sets of interpolation data with respect to a reference interpolation data. The data generator 223 then time-synchronizes each of the plurality of sets of interpolation data by subtracting or adding the delay time $t_a$ from or to the time value of the reference interpolation data.

The motion controller 224 controls motion of the robot 3 according to a motion command value that is based on a robot program. The compensation value calculator 225 calculates a motion trajectory of the robot 3, based on the composite data combined by the data generator 223. The compensation value calculator 225 then calculates a motion compensation value such that vibration of the robot 3 is reduced. The motion trajectory of robot 3 is calculated using a known technique. For example, a motion trajectory of the sensor 44 is determined by integrating the acceleration data contained in the composite data twice. The motion trajectory of sensor 44 is then transformed from the sensor coordinate system to the tool coordinate system, whereby the motion trajectory of robot 3 can be calculated.

The learning controller 226 performs learning control such that the calculated motion compensation value will be applied to the next motion control to be performed on the robot 3 according to the same motion command value. By repeating this learning control, the learning controller 226 reduces the vibration produced at the end effector 33 of the robot 3.

FIG. 4 is a flowchart illustrating processing that is performed by the robot control apparatus 2. In Step S1, the motion controller 224 controls motion of the robot 3 according to a motion command value that is based on a robot program, and the sensors 44 of the terminal devices 4 each detect an acceleration that is based on vibration of the robot 3. The terminal devices 4 transmit the sensor data detected by the sensors 44 to the robot control apparatus 2 via the communication units 41.

In Step S2, the coordinate transformer 221 transforms the sensor data received by the communication unit 21, from the sensor coordinate system based on the surface of the flange 32 of the robot 3 as the coordinate reference to the tool coordinate system based on the distal end of the robot 3 as the coordinate reference.

In Step S3, the interpolator 222 interpolates the plurality of sets of sensor data subjected to the coordinate transformation, by way of linear interpolation, spline interpolation, or the like. In Step S4, the data generator 223 generates composite data having fine sampling intervals, based on the plurality of sets of interpolation data interpolated by the interpolator 222.

In Step S5, the compensation value calculator 225 calculates a motion trajectory of the robot 3, based on the composite data combined by the data generator 223. The compensation value calculator 225 calculates a motion compensation value such that vibration of the robot 3 is reduced. In Step S6, the learning controller 226 performs learning control such that the calculated motion compensation value will be applied to the next motion control to be performed on the robot 3 according to the same motion command value.

According to the present embodiment, the control system 1 includes the sensors 44 that each detect an acceleration that is based on the vibration of the robot 3, the interpolator 222 that interpolates the plurality of sets of sensor data detected by the sensors 44, and the data generator 223 that generates composite data having fine sampling intervals, based on the plurality of sets of interpolation data interpolated by the interpolator 222.

This feature allows the control system 1 to generate the composite data having fine sampling intervals, by means of the sensors 44 of the terminal devices 4 even though the sensors 44 typically output data having sparse sampling intervals. Thus, the control system 1 can control motion of the robot 3 with high accuracy by using the composite data having fine sampling intervals.

The control system 1 further includes the compensation value calculator 225 that calculates a motion trajectory of the robot 3 from the composite data and calculates a motion compensation value for the robot 3 such that vibration of the robot 3 is reduced. This feature allows the control system 1 to suitably calculate the motion compensation value for the robot 3.

The control system 1 further includes the learning controller 226 that performs learning control such that the motion compensation value calculated by the compensation value calculator 225 will be applied to motion control to be performed on the robot 3. This feature allows the control system 1 to suitably perform learning control on the robot 3.

The data generator 223 combines the plurality of sets of interpolation data and averages the composite data resulting from combining the plurality of sets of interpolation data. This feature allows the control system 1 to acquire the composite data suitable for calculating the motion compensation value.

Furthermore, the data generator 223 calculates a correlation coefficient on the basis of the plurality of sets of interpolation data, combines the plurality of sets of interpolation data on the basis of the correlation coefficient, and averages the composite data resulting from combining the plurality of sets of interpolation data. This feature allows the control system 1 to acquire the composite data suitable for calculating the motion compensation value.

Furthermore, the data generator 223 time-synchronizes the plurality of sets of interpolation data and generates the composite data, based on the plurality of time-synchronized sets of interpolation data. This feature allows the control system 1 to acquire the composite data suitable for calculating the motion compensation value.

The control system 1 further includes the terminal devices 4 that have the sensors 44 and are installed on the robot 3, and the coordinate transformer 221 that transforms sensor data, from the sensor coordinate system based on the flange surface of the robot 3 as the coordinate reference to the tool coordinate system based on the distal end of the robot 3 as the coordinate reference. This feature allows the control system 1 to generate the composite data having fine sampling intervals, by means of the sensors 44 of the plurality of terminal devices 4 (terminal devices 4a and 4b).

It should be noted that the embodiment described above is not intended to limit the present invention. In the embodiment described above, most favorable effects exerted by the present invention are merely disclosed, and the effects of the present invention are not limited to those described above.

EXPLANATION OF REFERENCE NUMERALS

1: Control system
2: Robot control apparatus
3: Robot
4: Terminal device
21: Communication unit
22: Control unit
23: Storage unit
41: Communication unit
42: Control unit
43: Storage unit
44: Sensor
221: Coordinate transformer
222: Interpolator
223: Data generator
224: Motion controller
225: Compensation value calculator
226: Learning controller

The invention claimed is:

1. A control system comprising:
a plurality of sensors that detect acceleration based on vibration of a robot;
an interpolator that interpolates a plurality of sets of sensor data detected by the-plurality of sensors and generates continuous interpolation data; and
a data generator that generates composite data having predetermined sampling intervals and superimposes waveforms of the plurality of sets of interpolation data on each other, based on the plurality of sets of interpolation data interpolated by the interpolator, wherein the plurality of sets of interpolation data comprises at least two temporally concurrent sets of data which are not time-synchronized with each other.

2. The control system according to claim 1, further comprising:
a compensation value calculator that calculates a motion trajectory of the robot from the composite data and calculates a motion compensation value for the robot such that vibration of the robot is reduced.

3. The control system according to claim 2, further comprising:
a learning controller that performs learning control such that the motion compensation value calculated by the compensation value calculator is applied to motion control to be performed on the robot.

4. The control system according to claim 1,
wherein the data generator combines the plurality of sets of interpolation data, and averages the composite data resulting from combining the plurality of sets of interpolation data.

5. The control system according to claim 4,
wherein the data generator calculates a correlation coefficient based on the plurality of sets of interpolation data, combines the plurality of sets of interpolation data based on the correlation coefficient, and averages the composite data resulting from combining the plurality of sets of interpolation data.

6. The control system according to claim 1,
wherein the data generator time-synchronizes the plurality of sets of interpolation data and generates the composite data, based on the plurality of time-synchronized sets of interpolation data.

7. The control system according to claim 1, further comprising:
a plurality of terminal devices each having the plurality of sensors, the plurality of terminal devices being installed on the robot; and
a coordinate transformer that transforms the sensor data, from a sensor coordinate system based on a flange surface of the robot as a coordinate reference to a tool coordinate system based on a distal end of the robot as a coordinate reference.

* * * * *